United States Patent Office 3,148,187
Patented Sept. 8, 1964

3,148,187
SULFONATED CYANINE AND MEROCYANINE DYES
Donald W. Heseltine, Rochester, N.Y., assignor to Eastman Kodak Company, Rochester, N.Y., a corporation of New Jersey
No Drawing. Filed Jan. 22, 1962, Ser. No. 167,954
10 Claims. (Cl. 260—240.4)

This invention is related to a new class of solubilized cyanines and merocyanine dyes, and more particularly to nuclear sulfonated cyanine and merocyanine dyes for photography and their synthesis by a direct nuclear sulfonation process.

Cyanine and merocyanine dyes are useful in photography as sensitizing dyes, light-filtering dyes, antihalation dyes, etc. It is known to solubilize certain cyanine and merocyanine dyes by substituting groups such as carboxymethyl, carboxyethyl, sulfopropyl and sulfobutyl on the nitrogen atoms in the heterocyclic nuclei of the dyes. Solubilized dyes are easier to use in manufacturing photographic elements requiring the dyes. New classes of solubilized dyes have been desired.

Certain of these dyes, particularly the cyanines are known to be unstable in strongly basic solutions and are discolored by sulfuric acid. Since methods for the direct nuclear sulfonation of cyanine and merocyanine dyes have not been available, these sulfonated dyes have not been available.

It is, therefore, an object of my invention to provide a method for the direct nuclear sulfonation of cyanine and merocyanine dyes with concentrated sulfuric acid or oleum.

Another object is to provide a valuable new class of nuclear sulfonated dyes which are valuable for photography because of their water solubility, their ability to be mordanted in filter layers or antihalation layers, and their greatly reduced tendency to produce stains in processed photographic elements which contain them compared to photographic elements containing conventional dyes.

These and other objects will be apparent from the following specification and claims.

These objects are accomplished according to my invention by a process in which many cyanine and merocyanine dyes are directly sulfonated on a carbon atom in one or both nuclei by sulfuric acid or oleum. I have found that these sulfonation reactions are catalyzed by the presence of ferric chloride in the reaction mixture.

The nuclear sulfo-substituted dyes of my invention include the cyanine dyes represented by the formula:

(I) 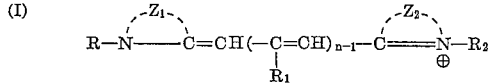

and include the merocyanine dyes represented by the formula:

(II) 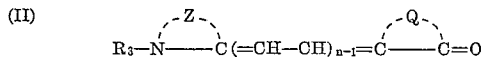

in which R and $R_2$ each represents a lower alkyl group such as methyl, ethyl, propyl, isopropyl, butyl, secondary butyl, tertiary butyl, etc., a sulfoalkyl group in which the alkyl group has from 1 to 4 carbon atoms, such as sulfomethyl, sulfoethyl, sulfopropyl, sulfobutyl, etc., and a carboxyalkyl group in which the alkyl group has from 1 to 4 carbon atoms such as carboxymethyl, carboxyethyl, carboxypropyl, carboxybutyl, etc.; $R_1$ represents a hydrogen atom or a lower alkyl group such as methyl, ethyl, propyl, butyl, etc.; Z, $Z_1$ and $Z_2$ each represents the nonmetallic atoms necessary to complete a heterocyclic nucleus of the benzothiazole series (e.g., benzothiazole, 4-chlorobenzothiazole, 5-chlorobenzothiazole, 7-chlorobenzothiazole, 4-methylbenzothiazole, 5-methylbenzothiazole, 5-bromobenzothiazole, 4 - phenylbenzothiazole, 5-phenylbenzothiazole, 6-phenylbenzothiazole, 4-methoxybenzothiazole, 5-methoxybenzothiazole, 5-iodobenzothiazole, 4-ethoxybenzothiazole, 5 - ethoxybenzothiazole, 5-hydroxybenzothiazole, etc.); those of the naphthothiazole series (e.g., α-naphthothiazole, β-naphthothiazole, 5-methoxy-β-naphthothiazole, 5-ethyl-β-naphthothiazole, 8-methoxy-α-naphthothiazole, 7 - methoxy - α - naphthothiazole, etc.); those of the benzoxazole series (e.g., benzoxazole, 5-chlorobenzoxazole, 5 - methylbenzoxazole, 5-phenylbenzoxazole, 5-methoxybenzoxazole, 5-ethoxybenzoxazole, 5-hydroxybenzoxazole, etc.); those of the naphthoxazole series (e.g., α-naphthoxazole, β-naphthoxazole, etc.); those of the benzoselenazole series (e.g., benzoselenazole, 5-chlorobenzoselenazole, 5 - methylbenzoselenazole, 5-hydroxybenzoselenazole, etc.); those of the naphthoselenazole series (e.g., α-naphthoselenazole, β-naphthoselenazole, etc.); those of the quinoline series including the 2-quinolines (e.g., quinoline, 3-methylquinoline, 5-methylquinoline, 7-methylquinoline, 8-methylquinoline, 6-chloroquinoline, 8-chloroquinoline, 6-methoxyquinoline, 6-hydroxyquinoline, 8-hydroxyquinoline, etc.); the 4-quinolines (e.g., quinoline, 6-methoxyquinoline, 7-methoxyquiniline, 8-methoxyquinoline, etc.); those of the isoquinoline series (e.g., the 1-isoquinolines, the 3-isoquinolines, etc.); such that Z has a sulfo-substituent, and such that at least one of the groups $Z_1$ and $Z_2$ has a sulfo-substituent; Q represents the nonmetallic atoms necessary to complete a heterocyclic nucleus of the sulfophenyl-pyrazolone series, e.g., 3 - methyl-1-p-sulfophenyl-2-pyrazolin-5-one, 3-ethyl-1-p-sulfophenyl-2-pyrazolin-5-one, 3-p-sulfophenyl-1-methyl-2-pyrazolin-5-one, etc.); $R_3$ represents a lower alkyl group, such as methyl, ethyl, propyl, butyl, etc.; and n is the integer 1, 2 or 3.

The dyes of my invention represented by Formulas I and II are prepared by sulfonating the parent dye represented by formula:

(III) 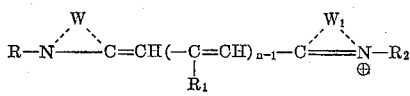

and formula:

(IV) 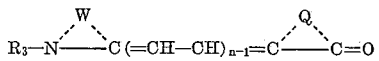

respectively, in which R, $R_1$, $R_2$, $R_3$, n, and Q are as defined previously and in which W and $W_1$ each represents the nonmetallic atoms necessary to complete the same nuclei formed by the Z groups defined previously but nuclei which are unsulfonated.

The dyes of Formulas III and IV are sulfonated by dissolved them in the sulfonating agent and heating to the reaction temperature until the sulfonation is completed. The reaction mixture is then chilled, poured over crushed ice, the crude sulfonated dye is separated from the reaction mixture and purified by recrystallization. In the synthesis of some sulfonated cyanine dyes, it is advantageous to neutralize a part or all of the excess sulfonating agent by adding an amine such as triethylamine, pyridine, etc., when necessary to precipitate the crude dye product. Suitable solvents such as acetone, methanol, etc., are used for purifying the dyes by recrystallization procedures. In the synthesis of the sulfonated merocyanine dyes, it is advantageous to dissolve the crude dye collected on a filter with hot methanol as the triethylamine salt, and following several recrystallizations precipitating the dye by the addition of concentrated hydrochloric acid.

I have found that concentrated sulfuric acid, or concentrated sulfuric acid to which has been added 20 percent oleum, is used advantageously as a sulfonating agent. In general, the dyes with naphthothiazole, naphthoxazole and naphthoselenazole nuclei and the aromatic substituted benzothiazole, benzoxazole and benzoselenazole nuclei are easier to sulfonate than dyes with the benzothiazole, benzoxazole and benzoselenazole nuclei. For the sulfonation reactions requiring oleum, it is advantageous to add enough oleum to give 100 percent sulfuric acid with enough dissolved sulfur trioxide to sulfonate the dye.

The sulfonation reaction is greatly facilitated by the addition of small amounts of ferric chloride as a catalyst. Some of the dyes with neuclei that are very difficult to sulfonate even with the oleum are readily sulfonated when a catalyzing amount of ferric chloride is present.

The sulfonation reaction mixture is heated to an external temperature in the range of from about 160° to about 210° C.

The parent dyes having Formulas III and IV are well known in the art and are described in various patents. The cyanine dyes of Formula III, for example, are described by Hamer U.S. Patent 2,108,485, issued February 15, 1938; Beilenson U.S. Patent 2,120,322, issued June 14, 1938; Brooker and White U.S. Patent 2,112,140, issued March 22, 1938; Brooker and White U.S. Patent 2,233,509, issued March 4, 1941; Larive et al. U.S. Patent 2,921,067, issued January 12, 1960; White and Brooker U.S. Patent 2,518,737, issued August 15, 1950; British Patent 742,112, complete specification published December 21, 1955; etc. The merocyanine dyes of Formula IV, for example, are described by Brooker and White U.S. Patent 2,526,632, issued October 24, 1950; Brooker and White U.S. Patent 2,493,747, issued January 10, 1950; Larive et al. U.S. Patent 2,921,067, issued January 12, 1960, etc.

In addition to the solubilized merocyanine dyes of Formula II, we have found that it is advantageous to use a new class of solubilized dyes of the type of Formula II in which a 1,3-trimethylene bridge such as a neopentylene group is attached to the intercyclic polymethine chain of the dye molecule in which case $n$ can be a value of 3 or 4. These dyes include the dyes such as described by Brooker and Heseltine U.S. Patent 2,856,404, issued October 14, 1958, but which have been substituted with an acidic radical as identified above. Representative dyes of this type include dyes, such as 3-methyl-4-{6-[3-(4-sulfobutyl)-2-benzoxazolinylidene]-1,3-neopentylene-2,4-hexadienylidene}-1-p-sulfophenyl-2-pyrazolin-5-one, 3-methyl-4 - {6-[3-(2-sulfoethyl)-2-benzoxazolinylidene]-1,3-neopentylene - 2,4-hexadienylidene}-1-p-sulfophenyl-2-pyrazolin-5-one, 3-methyl-4-{6-[3-(2-carboxyethyl)-2-benzoxazolinylidene] - 1,3 - neopentylene-2,4-hexadienylidene}-1 - p-sulfophenyl-2-pyrazolin-5-one, 3-methyl-4-{6-[3-(4-sulfobutyl) - 2-benzoxazolinylidene]-1,3-neopentylene-2-butenylidene} - 1 - p-sulfophenyl-2-pyrazolin-5-one, etc. Dyes of this type can be prepared by condensing a N-sulfoalkyl heterocyclic quaternary salt containing a reactive methyl group with an intermediate of Formula I of U.S. 2,856,404.

My invention is illustrated by specific representative examples. Included among the sulfonated cyanine dyes made according to my invention are those of Examples 1 through 5, and included among the sulfonated merocyanine dyes are those of Examples 6 and 7.

EXAMPLE 1

Anhydro - 5'-Chloro-9-Ethyl-3-Methyl-3'-(3-Sulfobutyl)-4,5-Benzothiacarbocyanine Hydroxide, Monosulfonated

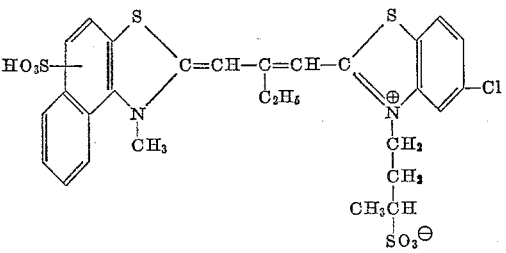

Anhydro - 5'-chloro-9-ethyl-3-methyl-3'-(3-sulfobutyl)-4,5-benzo-thiacarbocyanine hydroxide (5 grams) was dissolved in concentrated sulfuric acid (25 ml.) and heated for 1 hour at an external temperature of 200–210° C. The cooled mixture was then poured onto cracked ice and partially neutralized with pyridine (30 ml.). The crude dye was collected by filtering through a pad of filter cel and washed on the filter with acetone. The dye was then extracted from the filter cel with hot methanol (250 ml.), filtered and the solution concentrated to 100 ml. After chilling, the dye (73 percent) was collected in a tube centrifuge. After two recrystallizations, carried out by dissolving the dye in a minimum of hot methanol and filtering into acetone and collecting on a filter, the yield of purified dye was 2.0 grams (35 percent), M.P.>300° C.

EXAMPLE 2

Anhydro-3,3'-Diethyl-9-Methyl-4,5;4',5'-Dibenzothiacarbocyanine Hydroxide, Disulfonated

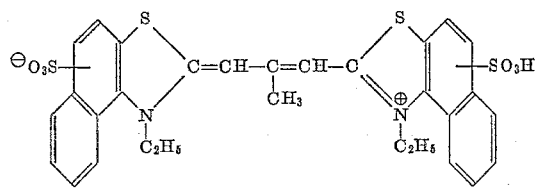

3,3' - diethyl - 9 - methyl - 4,5;4',5' - dibenzothiacarbocyanine chloride (10 grams) was dissolved in concentrated sulfuric acid (50 ml.) and heated at an external flask temperature of 200–210° C. for 1 hour. After chilling, the reaction mixture was poured on cracked ice, neutralized with pyridine, and the crude dye collected on a filter and washed with acetone. After two recrystallizations from methyl alcohol, the yield of purified dye was 5.5 grams (43 percent), M.P. 269–270° C.

EXAMPLE 3

Anhydro-9-Ethyl-3,3'-Dimethyl-4,5;4',5'-Dibenzothiacarbocyanine Hydroxide, Disulfonated

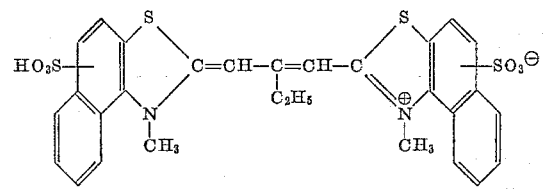

9 - ethyl - 3,3' - dimethyl - 4,5;4',5' - dibenzothiacarbocyanine chloride (5 grams) was dissolved in concentrated sulfuric acid (25 ml.) and heated at an external flask temperature for 1 hour at 200–210° C. After chilling, the reaction mixture was poured onto cracked ice (200 grams). The yellow hydrosulfate was collected on a filter and then suspended in methanol, neutralized with triethylamine and heated to reflux. The methanol solution was filtered, chilled and the solid collected in a tube centrifuge. The crude dye was washed with acetone in the tube centrifuge and finally collected on a filter. The crude dye was then twice recrystallized from methanol. The yield of pure dye was 3.35 grams (54 percent), M.P. 270–271° C.

EXAMPLE 4

*Anhydro-3,3'9--Triethyl-5,5'-Di(p-Sulfophenyl)-Oxacarbocyanine Hydroxide*

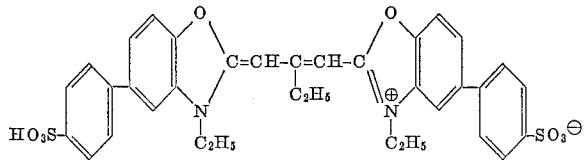

3,3',9 - triethyl - 5,5' - diphenyloxacarbocyanine bromide (5 grams) was dissolved in concentrated sulfuric acid (25 ml.) and the mixture heated on the oil bath at 160–165° for 1 hour. After chilling, the reaction mixture was poured onto ice, neutralized with pyridine and the crude dye collected on a filter. After two recrystallizations from methanol, the yield of purified dye was 2.0 grams (29 percent), M.P. 312–313° dec.

EXAMPLE 5

*Anhydro-1,1'-Diethyl-2,2'-Cyanine Hydroxide, Monosulfonated*

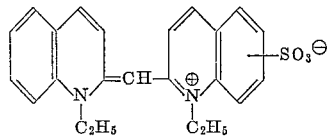

1,1'-diethyl-2,2'-cyanine iodide (4.54 grams) was dissolved in a mixture of concentrated sulfuric acid (10 ml.) and 20 percent oleum (15 ml.) and .1 gram of ferric chloride was added. The mixture was heated at an external flask temperature of 200–210° for 1 hour. After chilling, the mixture was poured onto 200 grams of ice and the crude dye collected on a filter. The crude dye was then dissolved in methanol and the unreacted starting material converted to the perchlorate salt by addition of sodium perchlorate. The dye was then precipitated by the addition of ether and collected on a funnel. The soluble perchlorate starting material was extracted with acetone and the residue was twice recrystallized from methanol. The yield of purified dye was 0.60 gram (15 percent), M.P. 292–293° dec.

EXAMPLE 6

*4 - [(3 - Ethyl - 2(3H)-Benzoxazolylidene)Ethylidene]-3-Methyl-1-p-Sulfophenyl - 2 - Pyrazolin-5-One, Monosulfonated*

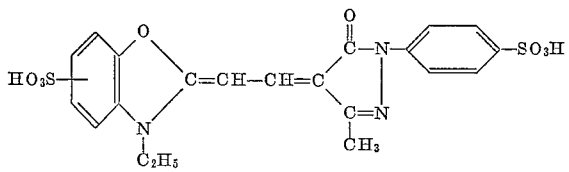

4-[(3-ethyl - 2(3H) - benzoxazolylidene)ethylidene]-3-methyl-1-p-sulfophenyl-2-pyrazolin-5-one (5 grams) was dissolved in a mixture of concentrated sulfuric acid (10 ml.) and 20 percent oleum (15 ml.) and ferric chloride (0.1 gram) was added. The reaction mixture was heated at an external flask temperature of 200–210° for 1 hour and after chilling was poured onto 200 grams of ice. The crude dye was collected on a filter and then twice recrystallized by dissolving in hot methanol as the triethylamine salt, filtering and precipitating the dye by the addition of concentrated hydrochloric acid. After two such treatments, the yield of purified dye was 3.9 grams (65 percent), M.P. >310°.

EXAMPLE 7

*4-[4-(3-Ethyl-2(3H) - Benzoxazolylidene) - 2 - Butenylidene]-3-Methyl-1-p - Sulfophenyl - 2 - Pyrazolin-5-One, Monosulfonated*

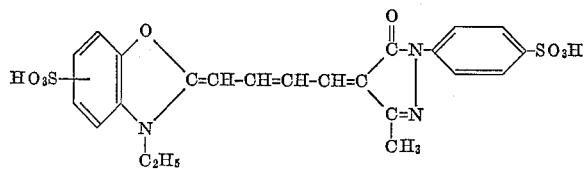

4-[4-(3-ethyl-2(3H)-benzoxazolylidene) - 2 - butenylidene]-3-methyl - 1 - p - sulfophenyl-2-pyrazolin-5-one (5 grams) was dissolved in a mixture of concentrated sulfuric acid (10 ml.) and 20 percent oleum (15 ml.) and ferric chloride (0.1 gram) was added. After heating at an external temperature of 200–210° for 1 hour, the reaction mixture was chilled and then poured onto cracked ice. The crude dye was collected on a filter, washed with acetone and then twice recrystallized by dissolving in hot methanol with triethylamine, filtering and precipitating by the addition of concentrated hydrochloric acid. The yield of purified dye was 1.0 gram (17 percent), M.P. >300° C.

My sulfonated dyes are valuable for use in photography because of their good solubility in water which makes it easy to add them to the photographic elements during manufacture. For example, the cyanine dyes which are especially valuable as sensitizers for silver halide emulsions can be added as a water solution. Not only is the high water solubility of my dyes valuable for manufacturing purposes, but it is also valuable because the sensitizing dyes readily wash out of the photographic elements containing them during normal processing. Thus, photographic elements containing my dyes are less subject to stain than conventional elements. My solubilized merocyanine dyes are especially valuable for use in light-filtering layers in which they are unusually well mordanted by basic mordants. Although the mordanted dyes have good nonwandering properties, they are easily and completely released in normal photographic processing solutions.

My solubilized dyes are prepared by the direct nuclear sulfonation of cyanine and merocyanine dyes. This reaction is accomplished by heating a solution of the parent cyanine or merocyanine dye in the sulfonating agent which may be concentrated sulfuric acid or oleum containing sufficient sulfur trioxide to sulfonate the dye. This reaction is catalyzed advantageously by the presence of ferric chloride. The dyes made according to my invention are distinguished from the prior art dyes by having at least one nuclear sulfo-substituent, that is, at least one sulfo group attached to a nuclear carbon atom rather than a nitrogen atom in the heterocyclic ring. Preferred dyes also have a second solubilizing group which may be a nuclear sulfo-substituent on the other nucleus of the dye molecule or a sulfoalkyl group or a carboxyalkyl group attached to a nitrogen atom in the other heterocyclic nucleus.

The invention has been described in detail with particular reference to preferred embodiments thereof but it will be understood that variations and modifications can be effected within the spirit and scope of the invention as described hereinabove and as defined in the appended claims.

I claim:

1. A dye containing at least one nuclear sulfo group selected from those having the formula:

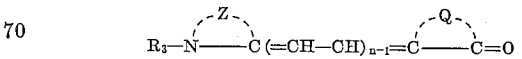

where $R_3$ represents a lower alkyl group; Z represents the nonmetallic atoms necessary to complete a sulfonated heterocyclic nucleus having the said sulfo group attached directly to a nuclear carbon atom, said nucleus being selected from the class consisting of a benzothiazole nucleus, a naphthothiazole nucleus, a benzoxazole nucleus, a naphthoxazole nucleus, a benzoselenazole nucleus, a naphthoselenazole nucleus, a quinoline nucleus, and an isoquinoline nucleus; Q represents the nonmetallic atoms necessary to complete a sulfophenyl-pyrazolone nucleus; and $n$ is an integer of from 1 to 3.

2. A process for the direct nuclear sulfonation of a dye selected from those having the formula:

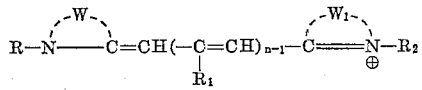

and the formula:

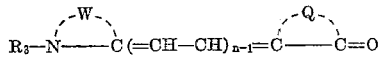

wherein R and $R_2$ each represents a member selected from the class consisting of a lower alkyl group, a carboxyalkyl group in which the alkyl group has from 1 to 4 carbon atoms, and a sulfoalkyl group in which the alkyl group has from 1 to 4 carbon atoms; $R_1$ represents a member selected from the class consisting of the hydrogen atom and a lower alkyl group; $R_3$ represents a lower alkyl group; W and $W_1$ each represents the nonmetallic atoms necessary to complete a heterocyclic nucleus selected from the class consisting of a benzothiazole nucleus, a naphthothiazole nucleus, a benzoxazole nucleus, a naphthoxazole nucleus, a benzoselenazole nucleus, a naphthoselenazole nucleus, a quinoline nucleus, and an isoquinoline nucleus; Q represents the nonmetallic atoms necessary to complete a sulfophenyl-pyrazolone nucleus; and $n$ is an integer of from 1 to 3; said process comprising the steps of:
  (1) dissolving said dye in concentrated sulfuric acid, and
  (2) heating said dye solution in the presence of ferric chloride to an external temperature of from about 160° C. to about 210° C. in order to substitute the —$SO_3H$ group directly on a carbon atom in at least one of the heterocyclic nuclei in each dye molecule, said nuclei being those completed by the nonmetallic atoms designated by W and $W_1$.

3. The dye 4-[(3-ethyl-2(3H)-benzoxazolylidene)ethylidene]-3-methyl-1-p-sulfophenyl-2-pyrazolin-5-one, monosulfonated having the formula:

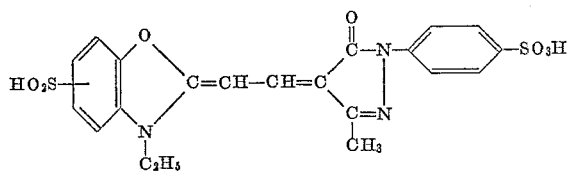

4. The process of claim 2 in which the concentrated sulfuric acid contains oleum.

5. The process for producing anhydro-5'-chloro-9-ethyl-3-methyl-3'-(3-sulfobutyl)-4,5-benzothiacarbocyanine hydroxide, monosulfonated by the direct nuclear sulfonation of the dye anhydro-5'-chloro-9-ethyl-3-methyl-3'-(3-sulfobutyl)-4,5-benzothiacarbocyanine hydroxide comprising the steps;
  (1) dissolving said dye in concentrated sulfuric acid, and
  (2) heating the solution of dye in sulfuric acid in the presence of ferric chloride at an external temperature in the range from 200° to 210° C. for one hour to sulfonate the dye with the sulfo group substituted directly on a carbon atom of the naphthothiazole nucleus.

6. The process for producing anhydro-9-ethyl-3,3'-dimethyl-4,5,4',5'-dibenzothiacarbocyanine hydroxide, disulfonted by the direct nuclear sulfonation of the dye 9-ethyl-3,3'-dimethyl-4,5,4',5'-dibenzothiacarbocyanine chloride comprising the steps;
  (1) Dissolving said dye in concentrated sulfuric acid, and
  (2) Heating the solution of dye in sulfuric acid in the presence of ferric chloride at an external temperature in the range from 200° to 210° C. for 1 hour to sulfonate the dye with the sulfo group substituted directly on a carbon atom in each of the naphthothiazole nuclei.

7. The process for producing anhydro-1,1'-diethyl-2,2'-cyanine hydroxide, monosulfonated by the direct nuclear sulfonation of the dye 1,1'-diethyl-2,2'-cyanine iodide comprising the steps;
  (1) Dissolving the said dye in a mixture of concentrated sulfuric acid, and 20 percent oleum, and
  (2) Heating the solution from step 1 in the presence of ferric chloride at an external temperature in the range from 200° to 210° C. for 1 hour.

8. The process for producing 4-[(3-ethyl-2(3H)-benzoxazolylidene)ethylidene]-3-methyl-1-p-sulfophenyl-2-pyrazolin-5-one, monosulfonated by the direct nuclear sulfonation of the dye 4-[(3-ethyl-2(3H)-benzoxazolylidene)ethylidene]-3-methyl-1-p-sulfophenyl-2-pyrazolin-5-one comprising the steps;
  (1) Dissolving the said dye in a mixture of concentrated sulfuric acid, and 20 percent oleum, and
  (2) Heating the solution from step 1 in the presence of ferric chloride at an external temperature in the range from 200° to 210° C. for 1 hour.

9. The process for producing 4-[4-(3-ethyl-2(3H)-benzoxazolylidene)-2-butenylidene]-3-methyl-1-p-sulfophenyl-2-pyrazolin-5-one, monosulfonated by the nuclear sulfonation of the dye 4-[4-(3-ethyl-2(3H)-benzoxazolylidene)-2-butenylidene]-3-methyl-1-p-sulfophenyl-2-pyrazolin-5-one comprising the steps;
  (1) Dissolving said dye in concentrated sulfuric acid, and
  (2) Heating the solution of dye in sulfuric acid in the presence of ferric chloride at an external temperature in the range from 160° to 165° C. for 1 hour to sulfonate the dye with the sulfo group substituted directly on a carbon atom in the benzoxazole nucleus.

10. The dye 4-[4-(3-ethyl-2(3H)-benzoxazolylidene)-2-butenylidene]-3-methyl-1-p-sulfophenyl-2-pyrazolin-5-one, monosulfonated, having the formula:

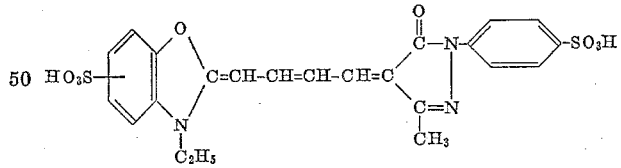

References Cited in the file of this patent

UNITED STATES PATENTS

| | | |
|---|---|---|
| 2,463,264 | Graenacher et al. | Mar. 1, 1949 |
| 2,526,632 | Brooket et al. | Oct. 24, 1950 |
| 2,609,371 | Firestine | Sept. 2, 1952 |
| 2,646,355 | Zweifel et al. | July 21, 1953 |
| 2,809,123 | Keller et al. | Oct. 8, 1957 |
| 2,905,667 | Siegrist et al. | Sept. 22, 1959 |
| 2,921,067 | Larive et al. | Jan. 12, 1960 |

FOREIGN PATENTS

| | | |
|---|---|---|
| 235,570 | Switzerland | Apr. 3, 1945 |
| 559,840 | Belgium | Oct. 5, 1958 |
| 803,361 | Great Britain | Oct. 22, 1958 |

OTHER REFERENCES

Kiprianov et al.: J. Gen. Chem. (U.S.S.R.), vol. 15, pages 207–14 (1945); abstracted in Chemical Abstracts, vol. 40, col. 2307 to 3210 (1946).